US006703454B2

(12) United States Patent
DeBruin

(10) Patent No.: US 6,703,454 B2
(45) Date of Patent: Mar. 9, 2004

(54) ADSORBER SYSTEM TO REPLACE WATER COLUMN IN A POLYESTER PROCESS

(75) Inventor: Bruce Roger DeBruin, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 227 days.

(21) Appl. No.: 10/013,317

(22) Filed: Dec. 7, 2001

(65) Prior Publication Data

US 2002/0091227 A1 Jul. 11, 2002

Related U.S. Application Data

(60) Provisional application No. 60/254,040, filed on Dec. 7, 2000.

(51) Int. Cl.[7] .............................. C08F 2/00; C08J 3/00; C08G 63/02

(52) U.S. Cl. ...................... 526/71; 528/272; 528/308.6; 528/490; 528/501; 526/62; 526/64; 526/65; 526/67

(58) Field of Search ............................. 528/272, 308.6, 528/490, 501; 526/62, 64, 65, 67, 71

(56) References Cited

U.S. PATENT DOCUMENTS 3,052,711 A 9/1962 Glogau et al.
3,241,926 A 3/1966 Parker et al.
3,522,214 A 7/1970 Crawford et al.
3,644,294 A 2/1972 Siclari et al.
3,697,579 A 10/1972 Balint et al.
4,118,582 A 10/1978 Walker
4,146,729 A 3/1979 Goodley et al.
4,554,343 A 11/1985 Jackson, Jr. et al.
4,680,376 A 7/1987 Heinze et al.
5,041,525 A 8/1991 Jackson
5,064,935 A 11/1991 Jackson et al.
5,294,305 A 3/1994 Craft, Sr. et al.
5,413,681 A * 5/1995 Tustin et al. .................. 203/80
5,480,616 A 1/1996 Richardson et al.
5,519,112 A 5/1996 Harazoe et al.
5,688,898 A * 11/1997 Bhatia ........................ 528/272
5,849,849 A * 12/1998 Bhatia ........................ 525/444
5,932,105 A 8/1999 Kelly
6,096,838 A * 8/2000 Nakamoto et al. ............ 526/64
6,174,970 B1 1/2001 Braune
2002/0091227 A1 7/2002 Debruin
2002/0128399 A1 9/2002 Nakamoto et al.
2002/0137877 A1 9/2002 Debruin
2002/0180099 A1 12/2002 Keillor, III

FOREIGN PATENT DOCUMENTS

DE 2200832 1/1972
FR 2302778 A1 3/1975
JP 424993 B 3/1967
JP 4218353 B 9/1967
JP 4739043 A 4/1971
JP 55-135133 A 10/1980
JP 62-292831 A 12/1987
JP 1998/259244 A 9/1998
JP 1999/092555 A 4/1999
JP 2000/095851 A 4/2000
PL 136188 8/1987
WO WO 99/16537 4/1999
WO WO 03/006526 A1 1/2003

OTHER PUBLICATIONS

Stahl, Wegmann, Von Rohr;Tubular reactor for liquid reactions with gas release; Catalysis Today 79–80; 2003; pp. 89–95.

* cited by examiner

*Primary Examiner*—Samuel A. Acquah
(74) *Attorney, Agent, or Firm*—Steven A. Owen; Bernie Graves

(57) ABSTRACT

The present invention provides a process for recovering a dihydroxy compound from a fluid stream that results from the preparation of a polyester by use of an adsorption system to selectively recover the dihydroxy compound.

16 Claims, 1 Drawing Sheet

184
198
185
187
196
199
190
192
194
193
181
182
183
195
191
188
189
186
197

ADSORBER SYSTEM TO REPLACE WATER COLUMN IN A POLYESTER PROCESS

CROSS REFERENCE TO RELATED APPLICATIONS

This application claims priority to U.S. Provisional Application Serial Nov. 60/254,040, filed Dec. 7, 2000, which application is hereby incorporated by this reference in its entirety for all purposes.

FIELD OF THE INVENTION

This invention relates generally to polyester processes and apparatuses, more specifically, to polyester processes and apparatuses comprising an adsorption system in the absence of a water column and other distillation system components.

BACKGROUND OF THE INVENTION

As the business of manufacturing polyesters becomes more competitive, alternative lower cost manufacturing processes and apparatuses have become highly desirable. A variety of processes and apparatuses have been developed, however, these systems contain complex and costly designs that cannot be built or installed quickly. They also require costly expertise to properly maintain and operate. For example, in typical polyester processing facilities, it is common for a reactor system to contain a series of distillation columns, for among various purposes, recovering unreacted dihydroxy compounds that may be contained in the various fluid streams that result from the polyester manufacturing processes.

A typical distillation system would comprise a water column, stripper column, and an MGM column (mixed glycol and monomer column or ethylene glycol condensate column). Commonly, fluid streams from one or more reactors are sent to the water column. There, water is separated from the glycol or other dihydroxy compound. Low boilers, such as water, are removed at the top of the column and sent to the stripper column, and the dihydroxy compounds such as glycol and other high boilers are removed at the bottom of the column where they can be sent back to the reactor system or, alternatively, sent to a storage facility. The stripper column separates out at the top of the stripper column various components, such as paradioxane, that cannot be sent to a waste water treatment facility.

These are complex and costly unit operations which further require significant amounts of space for proper installation and operation. Therefore, there is a need in the art for lower cost, simpler apparatuses and processes for separating and recovering unreacted dihydroxy compounds from the fluid streams that can result from a polyester manufacturing process.

SUMMARY OF THE INVENTION

Among other aspects, the present invention provides a process and apparatus for separating and recovering a dihydroxy compound from fluid streams that result from a polyester manufacturing process. More specifically, the invention provides for the use of an adsorption system in the absence of a water column and other distillation devices to provide a more compact and cost effective means for recovering a dihydroxy compound. As such, the use of an adsorption system according to the present invention in a polyester manufacturing process can reduce or even eliminate the need for bulky columns, equipment, tanks, agitators, pumps, and the like.

Therefore, in a first aspect, the present invention provides a process for recovering a dihydroxy compound from a fluid stream that results from the preparation of a polyester comprising the steps of: (a) providing a reactor having an internal volume wherein at least a portion of the internal volume is occupied by a reaction mixture comprising at least one dicarboxylic acid or ester thereof and at least one dihydroxy compound; (b) esterifying or transesterifying the at least one dicarboxylic acid or ester thereof with the at least one dihydroxy compound in the reactor to thereby produce: (i) an esterification product or transesterification product; and (ii) a fluid stream comprising the at least one dihydroxy compound; and (c) subjecting the fluid stream resulting from the esterification or transesterification reaction of step (b) to an adsorption system to selectively recover the dihydroxy compound.

In a second aspect, the present invention provides a process for recovering a dihydroxy compound from a fluid stream that result from the preparation of a polyester polymer comprising the steps of: (a) providing a reactor having an internal volume wherein at least a portion of the internal volume is occupied by a polyester monomer; (b) polycondensing the polyester monomer to produce a polyester polymer and fluid stream comprising the dihydroxy compound; and (c) subjecting the fluid stream resulting from the polycondensation reaction to an adsorption system to selectively recover the dihydroxy compound.

In a third aspect, the present invention provides a process for recovering a dihydroxy compound from a fluid stream that results from the preparation of a polyester polymer comprising the steps of: (a) providing a first reactor having a first internal volume wherein at least a portion of the first internal volume is occupied by a reaction mixture comprising at least one dicarboxylic acid component and at least one dihydroxy compound component; (b) esterifying or transesterifying the at least one dicarboxylic acid component with the at least one dihydroxy compound component to produce: (i) an esterification product or transesterification product; and (ii) a first fluid stream comprising the dihydroxy compound; (c) providing a second reactor in fluid communication with the first reactor having a second internal volume wherein at least a portion of the second internal volume is occupied by the esterification or transesterification product of step (b); (d) polycondensing the esterification or transesterification product of step (c) to produce a polyester polymer and a second fluid stream comprising the dihydroxy compound; and (e) subjecting the first fluid stream from step (b) and the second fluid stream from step (d) to an adsorption system to selectively recover the dihydroxy compound.

In still another aspect, the present invention further provides a process for recovering a dihydroxy compound from a fluid stream that result from the preparation of a polyester comprising the steps of: (a) providing a reactor having an internal volume wherein at least a portion of the internal volume is occupied by a reaction mixture comprising at least one dicarboxylic acid or ester thereof and at least one dihydroxy compound; (b) esterifying or transesterifying the at least one dicarboxylic acid or ester thereof with the at least one dihydroxy compound in the reactor to thereby produce: (i) an esterification product or transesterification product; and (ii) a fluid stream comprising the at least one dihydroxy compound; and (c) in the absence of a water column, subjecting the fluids stream resulting from the esterification or transesterification reaction of step (b) to an adsorption system to selectively recover the dihydroxy compound.

Additional advantages and embodiments of the invention will be obvious from the description, or may be learned by practice of the invention. Further advantages of the invention will also be realized and attained by means of the elements and combinations particularly pointed out in the appended claims. Thus, it is to be understood that both the foregoing general description and the following detailed description are exemplary and explanatory of certain embodiments of the invention and are not restrictive of the invention as claimed.

BRIEF DESCRIPTION OF THE DRAWINGS

For a clearer understanding of the present invention, reference is now made, by way of exemplification only, to accompanying FIG. 1, which shows a particular apparatus and configuration for use in practicing one embodiment of the present invention.

DETAILED DESCRIPTION OF THE INVENTION

Figure 1:
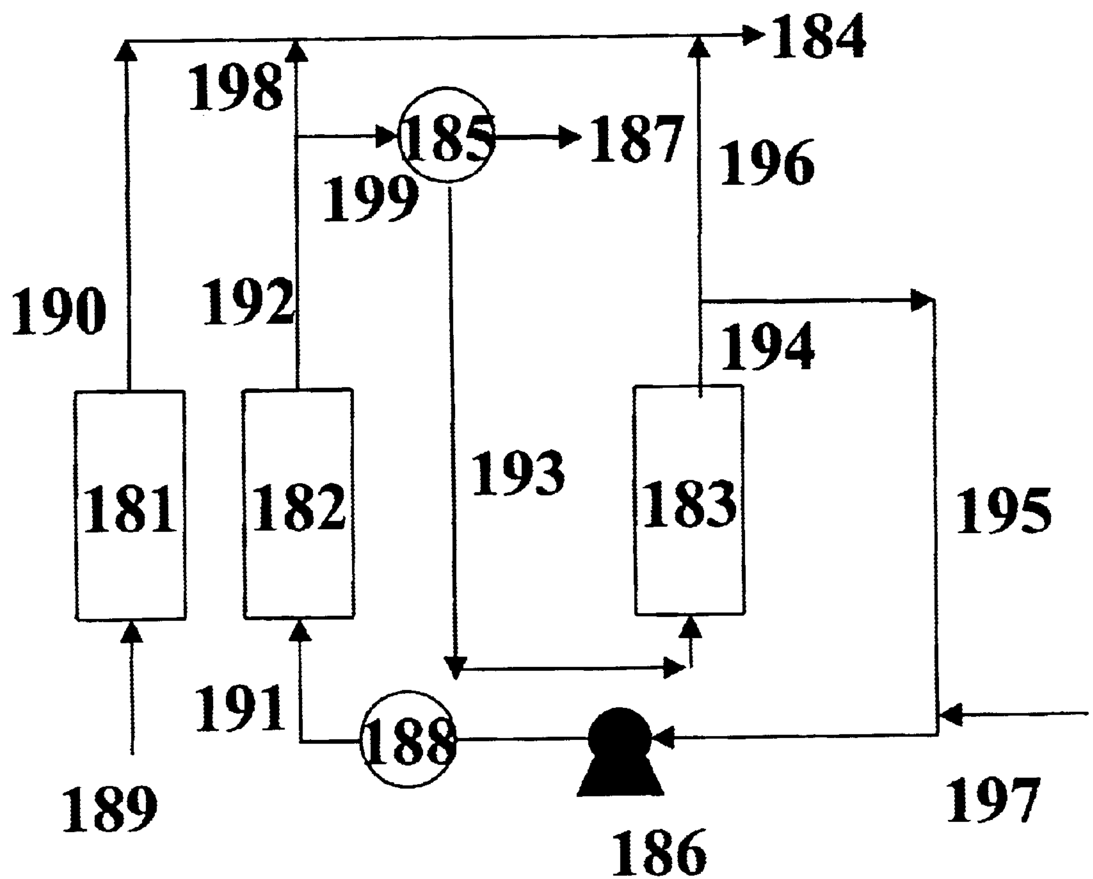

The present invention may be understood more readily by reference to the following detailed description and any examples provided herein. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Ranges may be expressed herein as from "about" or "approximately" one particular value and/or to "about" or "approximately" another particular value. When such a range is expressed, another embodiment comprises from the one particular value and/or to the other particular value. Similarly, when values are expressed as approximations, by use of the antecedent "about" or "approximately", it will be understood that the particular value forms another embodiment.

Throughout this application, where publications are referenced, the disclosures of these publications in their entireties are hereby incorporated by reference into this application in their entirety to more fully describe the state of the art to which this invention pertains.

As used in the specification and concluding claims, residue refers to the moiety that is the resulting product of the chemical species in a particular reaction scheme or subsequent formulation or chemical product, regardless of whether the moiety is actually obtained from the chemical species. Thus, for example, an ethylene glycol residue in a polyester refers to one or more —$OCH_2CH_2O$— repeat units in the polyester, regardless of whether ethylene glycol is used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

In a first embodiment, the present invention provides a process for recovering a dihydroxy compound from a fluid stream that results from the preparation of a polyester comprising the steps of: (a) providing a reactor having an internal volume wherein at least a portion of the internal volume is occupied by a reaction mixture comprising at least one dicarboxylic acid or ester thereof and at least one dihydroxy compound; (b) esterifying or transesterifying the at least one dicarboxylic acid or ester thereof with the at least one dihydroxy compound in the reactor to thereby produce: (i) an esterification product or transesterification product; and (ii) a fluid stream comprising the at least one dihydroxy compound; and (c) subjecting the fluid stream resulting from the esterification or transesterification reaction of step (b) to an adsorption system to selectively recover the dihydroxy compound.

In a second embodiment, the present invention provides a process for recovering a dihydroxy compound from a fluid stream that results from the preparation of a polyester polymer comprising the steps of: (a) providing a reactor having an internal volume wherein at least a portion of the internal volume is occupied by a polyester monomer; (b) polycondensing the polyester monomer to produce a polyester polymer and fluid stream comprising the dihydroxy compound; and (c) subjecting the fluid stream resulting from the polycondensation reaction to an adsorption system to selectively recover the dihydroxy compound.

In still a third embodiment, the present invention provides a process for recovering a dihydroxy compound from a fluid stream that results from the preparation of a polyester polymer comprising the steps of: (a) providing a first reactor having a first internal volume wherein at least a portion of the first internal volume is occupied by a reaction mixture comprising at least one dicarboxylic acid component and at least one dihydroxy compound component; (b) esterifying or transesterifying the at least one dicarboxylic acid component with the at least one dihydroxy compound component to produce: (i) an esterification product or transesterification product; and (ii) a first fluid stream comprising the dihydroxy compound; (c) providing a second reactor in fluid communication with the first reactor having a second internal volume wherein at least a portion of the second internal volume is occupied by the esterification or transesterification product of step (b); (d) polycondensing the esterification or transesterification product of step (c) to produce a polyester polymer and a second fluid stream comprising the dihydroxy compound; and (e) subjecting the first fluid stream from step (b) and the second fluid stream from step (d) to an adsorption system to selectively recover the dihydroxy compound.

It should also be understood that the process and apparatus of the present invention can be used in conjunction with any known polyester forming process. Accordingly, as used in the specification an appended claims, the phrase polyester process refers to an esterification process, an ester exchange process or even a polycondensation process. Alternatively, it is further contemplated that a polyester process according the present invention can comprise a combination of: (1) an esterification process and/or ester exchange process; and (2) a polycondensation process. Accordingly, the polyester process of the present invention can be any known process for forming a polyester monomer, polyester oligomer and/or a polyester homopolymer and/or copolymer.

To this end, it should be understood that as used herein, the term "polyester" is intended to include any known polyester derivatives, including, but not limited to, polyetheresters, polyester amides and polyetherester amides. Therefore, for simplicity, throughout the specification and claims, the terms polyester, polyether ester, polyester amide and polyethereseteramide may be used interchangeably and are typically referred to as polyesters, but it is understood that the particular polyester species is dependent on the starting materials, i.e., polyester precursor reactants and/or components.

As used herein, the term "esterification process" or "esterification reaction" refers to a polyester process in which a reactant with an acid functionality, such as a dicarboxylic acid is reacted to produce a polyester product. Likewise, as used herein, the term ester exchange process or ester exchange reaction refers to a polyester process in which a reactant with an alkyl end group, such as a methyl end group is reacted to produce a polyester product. Therefore, for simplicity, throughout the specification and appended claims, the terms esterification and ester exchange are used interchangeably and are typically referred to as an esterification, but it is understood that esterification or ester exchange depends upon the starting materials.

It is further within the scope of the present invention for an esterification or ester exchange process to comprise one or more integrated process features. For example, in one embodiment, an esterification process can comprise one esterification reactor. However, in an alternative embodiment, it is possible for the esterification process to comprise a system or train of esterification reactors configured in series, parallel, or a combination thereof. Therefore, in another embodiment, the esterification process may comprise two or more esterification reactors, all of which preferably are in fluid communication with each other.

As used herein, the term "polycondensation" is intended to refer to any known process for forming an oligomer and/or polymer. For example, in one embodiment, a polycondensation process according to the present invention is a process for forming a polyester oligomer and/or a polyester polymer.

Furthermore, in similar fashion to an esterification process as previously defined above, the polycondensation process can also comprise one or more separate and/or integrated process features. For example, in one embodiment, the polycondensation process can comprises one polycondensation reactor. However, in an alternative embodiment, the polycondensation process can comprise a system or train of two or more polycondensation reactors configured in series, parallel or a combination thereof. Therefore, in a second embodiment, the polycondensation process of the present invention can comprises two or more polycondensation reactors, all of which are preferable in fluid communication with each other. In still another embodiment, the polycondensation process comprises a first prepolymer or oligomer polycondensation reactor in fluid communication with a finisher or polymer reactor.

To that end, as used herein, the term "prepolymer reactor" or "oligomer reactor" is intended to refer to a first polycondensation reactor. Although not required, the prepolymer reactor is typically kept under vacuum. One of ordinary skill in the art will appreciate that a prepolymer reactor is often, without limitation, used to initially grow a prepolymer chain from a feed length of from approximately 1 to 5, to an outlet length of approximately 4 to 30.

In connection therewith, the term "finisher reactor" or "polymer reactor" as used herein is intended to refer to the last melt phase of polycondensation reaction system. Again, although not required, the second polycondensation or finisher reactor is often kept under vacuum. Furthermore, one of ordinary skill in the art will also appreciate that the finisher reactor is typically used to grow the polymer chain to the desired finished length.

The term reactor, as used throughout the specification and appended claims, is intended to refer to any known reactor that is suitable for use in a polyester process as described above. As such, a suitable reactor for use with the process and apparatus of the present invention is a reactor configured to define an internal volume wherein during any given polyester process, at least a portion of the internal volume of the reactor is occupied by a reaction mixture.

Examples of a suitable reactor for use with the process of the present invention include, without limitation, a pipe reactor, such as that disclosed in U.S. Provisional Application Serial No. 60/254,040, filed Dec. 7, 2000, and U.S. Utility Patent Application for a "Low Cost Polyester Process Using a Pipe Reactor," filed Dec. 7, 2001, which applications are hereby incorporated by this reference in their entireties for all purposes. In an alternative embodiment, the present invention can be practiced with a continuous stirred tank reactor, a reactive distillation column, stirred pipe reactor, thermal siphon reactor, forced recirculation reactor, trickle bed reactor, and any other reactor or reactor mechanism known for use in a chemical manufacturing process. Furthermore, it should also be understood that it is within the scope of the present invention for any of one or more of the reactors set forth herein to be configured for use in either a continuous, batchwise, or semi-batchwise polyester manufacturing process.

As used herein, the term or phrase "fluid" or "fluid stream" is intended to refer to any liquid, vapor or gas, or mixture thereof that is either present within or results from any region of a polyester manufacturing process reactor system. For example, without limitation, a fluid stream according to the present invention can come from a CSTR reactor and/or a pipe reactor. Likewise, the fluid stream may come from an esterification or ester exchange reactor, a polycondensation reactor or a combination thereof. To this end, the fluid or fluid stream can be any excess fluid stream that does not contain a significant amount of the polyester reaction product.

Suitable dicarboxylic acids for use in the present invention include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Specific examples of dicarboxylic acid comprise terephthalic acid, phthalic acid, isophthalic acid, naphthalene-2,6dicarboxylic acid, cyclohexanedicarboxylic acid, cyclohexanediacetic acid, diphenyl-4,4'-dicarboxylic acid, dipheny-3,4'-dicarboxylic acid, succinic acid, glutaric acid, adipic acid, azelaic acid, sebacic acid, mixtures thereof and the like.

Likewise, suitable dihydroxy compounds according to the present invention include cycloaliphatic diols preferably having 6 to 20 carbon atoms or aliphatic diols preferably having 3 to 20 carbon atoms. Specific examples of such diols include ethylene glycol, diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, mixtures thereof and the like.

Suitable dicarboxylic acid comonomers include without limitation, aromatic dicarboxylic acids, aliphatic dicarboxylic acids, esters of aliphatic or aromatic dicarboxylic acids, anhydrides of aliphatic or aromatic dicarboxylic esters, and mixtures thereof. In one embodiment, it is preferred that suitable dicarboxylic acid comonomers include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. To this end, more specific examples of suitable dicarboxylic acid comonomers include terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, succinic acid, glutaric acid, adipic acid, azelaic acid, sebacic acid, mixtures thereof and the like.

Suitable dihydroxy comonomers include without limitation aliphatic or aromatic dihydroxy compounds and mixtures thereof. In one embodiment, it is preferred that the suitable dihydroxy comonomers include cycloaliphatic diols preferably having 6 to 20 carbon atoms or aliphatic diols preferably having 3 to 20 carbon atoms. More specific examples of such diol comonomers include ethylene glycol, diethylene glycol, triethylene glycol, 1,4-cyclohexanedimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3),1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy)) bis(ethanol), mixtures thereof and the like.

As used herein, an "adsorption system" refers to a system of one or more adsorption beds, configured in series, parallel, or a combination thereof, designed to effect the transfer of excess or unreacted polyester process reactant, i.e. a dihydroxy compound, or a polyester process byproduct, from a fluid phase to one or more surfaces of the adsorption bed to be desorbed and recovered at a later time. To this end, suitable adsorption beds for use in the process of the present invention are well known in the art and are available from a number of companies in the United States and world wide. Briefly, an adsorption system according to the present invention preferably employs three or more adsorption beds to selectively adsorb and desorb a dihydroxy component(s) from a fluid stream through a combination of adsorption, desorption, and standby cycles, phases, or sequencing.

While applicable to any chemical process, the instant invention is particularly useful for recovering components from a polyester manufacturing process. To this end, preferred polyester manufacturing processes according to the present invention include, but are not limited to, processes for the manufacture of homo and copolymers of PET, PETG (PET modified with CHDM comonomer), fully aromatic or liquid crystalline polyesters, biodegradable polyesters which comprise butanediol, terephthalic acid and adipic acid, poly (cyclohexane-dimethylene terephthalate) homopolymer and copolymers, homopolymer and copolymers of CHDM, and dimethyl cyclohexanedicarboxylate, aliphatic-aromatic copolyesters, and mixtures thereof.

The use of an adsorption system for recovering unreacted and/or excess reactants, or for recovering byproducts from a polyester manufacturing process can advantageously reduce or eliminate columns, equipment, tanks, agitators, pumps, etc. and in one aspect of the present invention, can replace them with a few simple large pipes or tanks, a compressor, and two heat exchangers. Several additional advantages will also become apparent to one of ordinary skill in the art upon practicing the present invention.

For example, an adsorption system can conserve energy in that the reflux step present within a conventional distillation column is not required. Moreover, it will also be appreciated that an adsorption system provides for the recovery of purer product and less by-product as compared to that of a distillation system. For example, in an embodiment wherein a fluid stream comprises liquid and/or vapor ethylene glycol, the adsorption system will provide for the recovery of more pure ethylene glycol and much less, if any, byproduct such as water. This can be a significant advantage because, as will be discussed herein, the recovered dihydroxy compound such as ethylene glycol, can be recirculated back to any desired location within the reactor system, such as to the esterification or ester exchange reactor. Furthermore, the presence of water in the esterification or ester exchange reactor can significantly reduce the rate of reaction therein. As such, by recovering a dihydroxy compound with a lower water content and using the same in the reactor system, a higher rate of reaction can be obtained thereby allowing for a smaller system of esterification or ester exchange reactors.

With specific reference to FIG. 1, which illustrates one embodiment of the invention, there is shown an apparatus for use in practicing a particular embodiment of the invention. According to this embodiment, there is provided an adsorption system comprising a first, second and third adsorption bed wherein the first, second and third adsorption bed are in selectively controlled fluid communication with a fluid stream that results from a polyester manufacturing process.

In one embodiment, the first, second and third adsorption beds described above are subjected to at least one continuous cycle comprising: (a)(i) a first phase comprising passing a fluid stream through a fully desorbed first adsorption bed until the first adsorption bed is substantially saturated with at least one component from the fluid stream; (ii) simultaneously with step a(i), fully desorbing at least one component from a fully saturated second adsorption bed by passing a stream of inert gas through the fully saturated second adsorption bed; and (iii) simultaneously with steps a(i) and a(ii), maintaining a fully desorbed third adsorption bed in standby mode; (b)(i) a second phase comprising passing a fluid stream through a fully desorbed third adsorption bed until the third adsorption bed is substantially saturated with at least one component from the fluid stream; (ii) simultaneously with step b(i), fully desorbing at least one component from a fully saturated first adsorption bed by passing a stream of inert gas through the fully saturated first adsorption bed; and (iii) simultaneously with steps b(i) and b(ii), maintaining a fully desorbed second adsorption bed in standby mode; and (c)(i) a third phase comprising passing a fluid stream through a fully desorbed second adsorption bed until the second adsorption bed is substantially saturated with at least one component from the fluid stream; (ii) simultaneously with step c(i) fully desorbing at least one component from a fully saturated third adsorption bed by passing a stream of inert gas through the fully saturated third adsorption bed; and (iii) simultaneously with steps c(i) and c(ii), maintaining a fully desorbed first adsorption bed in standby mode.

It should also be understood that the term "standby mode" as used herein, in one embodiment, refers to a mode of operation wherein an adsorption bed is maintained as a fully desorbed adsorption bed whereby a fluid stream comprising a dihydroxy compound is not passing therethrough. Alternatively, in another embodiment, an adsorption bed that is operating on standby mode can simultaneously be partially saturated or loaded with a minimum amount of dihydroxy gas/vapors and/or liquid that is contained within a fluid stream that is exiting a condenser. Therefore, it is further within the scope of the present invention for a fully desorbed adsorption bed operating in standby mode to also simultaneously cleanse a fluid stream that is exiting a condensor.

Turning to FIG. 1, as shown in the drawing, a fluid stream from one or more reactors is fed to the first adsorber bed 181 as stream 189 and exits in stream 190. To this end, vapors or gases present within the fluid stream normally originate from an esterification reactor or ester exchange reactor. However, it is also contemplated that such vapors can come from a venting mechanism designed to remove entrained vapors present within recirculation fluids that are traversing through a recirculation loop such as that disclosed in U.S. Provisional Application Ser. No. 60/254,040, filed Dec. 7, 2000, which application is hereby incorporated by reference in its entirety. In one embodiment, the vapors or gases within the fluid stream comprise ethylene glycol.

The liquids that are present within the fluid stream will typically originate from the polycondensation reactors and other streams that may result from pump purges, pump seals, vacuum pumps, evaporator purges, intercondensers, and the like and mixtures thereof Therefore, in another embodiment, the liquid present within a fluid stream can comprise liquid ethylene glycol.

In a preferred embodiment, stream 190 has a continuous monitoring instrument that indicates when a desired component to be saved is exiting the bed. Any known instrument and/or means for continually monitoring the stream can be used such as an FTIR device, however, monitoring a single wavelength would also be appropriate with sufficient experience wherein a redirecting of stream 190 could be done with a timer after having gained the necessary experience. Furthermore, the monitoring could even be accomplished by performing manual grab samples.

Until and unless a desired component exits the adsorber as indicated by the monitoring device, all other components are sent via stream 190 to stream 184. Stream 184 goes to a thermal destruction device such as the Heat Transfer media furnace, a thermal oxidizer, a catalytic oxidizer, or the like. Once bed 181 is saturated and a desired component begins to exit stream 190, the fluid stream comprising the desired component is then redirected to the next adsorber bed.

For purposes of simplicity, in order to use the same drawing, bed 181 is now shown as a partially loaded bed that is being saturated via stream 189 from one or more reactors. Adsorption bed 182 is the now the fully saturated bed described in the preceding paragraph. Adsorption bed 183 is a fully desorbed bed. Bed 181 is now being saturated as previously described above.

Bed 182 has a hot stream of inert gas, such as nitrogen, carbon dioxide, argon, and the like supplied to it via stream 191 and coming from heat exchanger 188 which is heating the stream of inert gas. It should be understood that any convenient source of heat may be used such as steam, electricity, hot gas or vapor, or hot liquids such as heat transfer media and the like. In an alternative embodiment, heat may also be exchanged between condenser streams 187, 189, 192, 193 and stream 191. Furthermore, it is also contemplated by the present invention that conventional air to air heat exchangers as well as solid bed exchangers may be used.

The motive force for the inert gas stream comes from a compressor or blower 186 although an eductor device may be used with inert makeup stream 197. The pressure on the inlet of component 186 is maintained by the addition of inert gas stream 197 and recirculation stream 195.

The hot inert gas coming into bed 182 desorbs the components from the bed. Alternatively, steam or other hot condensable vapor may be used, but this could detract from the purity of the exiting stream and also requires additional separation equipment for the stream. Those skilled in the art appreciate that one can control the flow and temperature of stream 191 to accurately desorb bed 182 to thereby separate the desorbed components into highly pure, discrete pulses. These pulses exit in stream 192 and can be monitored by a similar device as that used in stream 190. When a non-desired component is removed from bed 182 into stream 192, a 3-way valve or multiple 2-way valves are switched and stream 192 is redirected via stream 198 to the thermal oxidation device via stream 184. Alternatively, stream 192 could pass through a non-cooled condenser 185 and proceed to stream 184 for thermal oxidation.

When a desired component is removed from bed 182 into stream 192, the valves are switched and stream 192 proceeds to stream 199 and into condenser 185. Condenser 185 can be cooled with air, refrigerated water, refrigerated gas, expansive cooling, or any other appropriate means for cooling known to one of ordinary skill in the art. The cooled stream 199 will fall below the saturation temperature and most if not all of the desired component that was present as a vapor or gas will condense from the stream as a liquid. The liquid in stream 187 is then directed to the appropriate storage container for that product. However, in an alternative embodiment, the condensed dihydroxy component can be recycled directly back to a reactor for further involvement in the preparation of a polyester monomer, oligomer or polymer.

Once stream 192 contains a non-desired component again, a device for selectively directing the stream such as a valve, switch or other selective controlling or redirecting means is again configured so that stream 192 goes to the thermal oxidation device. This selective directing, or switching process between desired and non-desired components continues until bed 182 is totally desorbed at which point bed 182 is put on standby.

A fluid stream exiting condenser 185 in stream 193 can also contain a minimum amount of the desired component to be recovered, but it is usually below the saturation temperature of condenser 185. As such, in one embodiment, stream 193 is then sent to the fully desorbed bed 183. Bed 183 adsorbs the desired components thereby cleansing stream 193. Stream 193 then exits bed 183 as stream 194. Stream 194 is directed back to the blower or compressor 186 as stream 195. Stream 197 further adds makeup inert gas to maintain a constant inlet pressure to compressor 186.

Once bed 181 is saturated and bed 182 has been desorbed, the bed functions cycle. Therefore, bed 181 takes the place of bed 182 in the cycle; bed 182 takes the place of bed 183; and bed 183 takes the place of Bed 181. Accordingly, in a second phase, bed 181 will be desorbed; Bed 182 will be on standby and/or adsorb desired components from condenser 185; and bed 183 will be saturated with at least one component from the vapor stream. Once bed 181 is desorbed and bed 183 is saturated, the bed functions will cycle a third time and phase three will begin.

It should be understood that further enhancements may be necessary based on system sizes and products being produced. For example, multiple adsorber beds may be required for each function as well as multiple cooling devices, compressors, heaters, and heat exchangers.

Throughout this application, various publications are referenced. The disclosures of these publications in their entireties are hereby incorporated by reference into this application in order to more fully describe the state of the art to which this invention pertains.

Although the present invention has been described with reference to specific details of certain embodiments thereof, it is not intended that such details should be regarded as limitations upon the scope of the invention except as and to the extent that they are included in the accompanying claims.

While this invention has been described in connection with preferred embodiments, it is not intended to limit the scope of the invention to the particular embodiments set forth, but on the contrary, it is intended to cover such alternatives, modifications, and equivalents as may be included within the spirit and scope of the invention as defined by the appended claims. For example, there are numerous variations and combinations of reaction conditions, e.g., component concentrations, desired solvents, solvent mixtures, temperatures, and value arrangements, that can be used to optimize the product purity and yield obtained from the described process. Also, one skilled in the art will appreciate that in practicing the process of this invention, only reasonable and routine experimentation will be required to optimize such process conditions.

What is claimed is:

1. A process for recovering a dihydroxy compound from a fluid stream that results from the preparation of a polyester comprising the steps of:

a) providing a reactor having an internal volume wherein at least a portion of the internal volume is occupied by a reaction mixture comprising at least one dicarboxylic acid or ester thereof and at least one dihydroxy compound;

b) esterifying or transesterifying the at least one dicarboxylic acid or ester thereof with the at least one dihydroxy compound in the reactor to thereby produce: (i) an esterification product or transesterification product; and (ii) a fluid stream comprising the at least one dihydroxy compound; and c) subjecting the fluid stream resulting from the esterification or transesterification reaction of step (b) to an adsorption system to selectively recover the dihydroxy compound.

2. The process of claim 1, wherein the reactor is a pipe reactor.

3. The process of claim 1, wherein the reactor is a continuous stirred tank reactor.

4. The process of claim 1, wherein the reactor is an esterification reactor or ester exchange reactor.

5. The process of claim 1, wherein the at least one dihydroxy compound comprises ethylene glycol.

6. The process of claim 1, wherein the at least one dicarboxylic acid compound comprises terephthalic acid.

7. The process of claim 1, wherein the adsorption system of step (c) comprises a first, second and third adsorption bed, wherein the first, second and third adsorption beds are in selectively controlled fluid communication with the fluid stream of step (b).

8. The process of claim 7, wherein step (c) further comprises subjecting the first, second and third adsorption beds to at least one continuous cycle having:

d) (i) a first phase comprising passing the fluid stream of step (b) through a fully desorbed first adsorption bed until the first adsorption bed is substantially saturated with at least one component from the fluid stream of step (b); (ii) simultaneously with step d(i) fully desorbing at least one component from a fully saturated second adsorption bed by passing a stream of inert gas through the fully saturated second adsorption bed; and (iii) simultaneously with steps d(i) and d(ii), maintaining a fully desorbed third adsorption bed in standby mode;

e) (i) a second phase comprising passing the fluid stream of step (b) through a fully desorbed third adsorption bed until the third adsorption bed is substantially saturated with at least one component from the fluid stream of step (b); (ii) simultaneously with step e(i) fully desorbing at least one component from a fully saturated first adsorption bed by passing a stream of inert gas through the fully saturated first adsorption bed; and (iii) simultaneously with steps e(i) and e(ii), maintaining a fully desorbed second adsorption bed in standby mode; and f) (i) a third phase comprising passing the fluid stream of step (b) through a fully desorbed second adsorption bed until the second adsorption bed is substantially saturated with at least one component from the fluid stream of step (b); (ii) simultaneously with step f(i) fully desorbing at least one component from a fully saturated third adsorption bed by passing a stream of inert gas through the fully saturated third adsorption bed; and (iii) simultaneously with steps f(i) and f(ii), maintaining a fully desorbed first adsorption bed in standby mode.

9. The process of claim 1, wherein the fluid stream of step (b) comprises vapor.

10. The process of claim 1, where the process is performed in the absence of a water column.

11. A process for recovering a dihydroxy compound from a fluid stream that result from the preparation of a polyester polymer comprising the steps of:

a) providing a reactor having an internal volume wherein at least a portion of the internal volume is occupied by a polyester monomer;

b) polycondensing the polyester monomer to produce a polyester polymer and fluid stream comprising the dihydroxy compound; and c) subjecting the fluid stream resulting from the polycondensation reaction to an adsorption system to selectively recover the dihydroxy compound.

12. The process of claim 11, wherein the fluid stream comprises a liquid.

13. The process of claim 11, where the process is performed in the absence of a water column.

14. A process for recovering a dihydroxy compound from a fluid stream that results from the preparation of a polyester polymer comprising the steps of:

a) providing a first reactor having a first internal volume wherein at least a portion of the first internal volume is occupied by a reaction mixture comprising at least one dicarboxylic acid component and at least one dihydroxy compound component;

b) esterifying or transesterifying the at least one dicarboxylic acid component with the at least one dihydroxy compound component to produce: (i) an esterification product or transesterification product; and (ii) a first fluid stream comprising the dihydroxy compound;

c) providing a second reactor in fluid communication with the first reactor having a second internal volume wherein at least a portion of the second internal volume is occupied by the esterification or transesterification product of step (b);

d) polycondensing the esterification or transesterification product of step (c) to produce a polyester polymer and a second fluid stream comprising the dihydroxy compound; and e) subjecting the first fluid stream from step (b) and the second fluid stream from step (d) to an adsorption system to selectively recover the dihydroxy compound.

15. The process of claim 14, wherein the first fluid stream comprises vapor and wherein the second fluid stream comprises liquid.

16. The process of claim 14, where the process is performed in the absence of a water column.

* * * * *